(12) United States Patent
Sahasrabudhe et al.

(10) Patent No.: US 11,151,047 B2
(45) Date of Patent: Oct. 19, 2021

(54) SYSTEM AND METHOD FOR MANAGING A HETEROGENEOUS CACHE

(71) Applicant: EMC IP Holding Company LLC, Hopkinton, MA (US)

(72) Inventors: Kaustubh S. Sahasrabudhe, Westborough, MA (US); Steven John Ivester, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 16/388,855

(22) Filed: Apr. 18, 2019

(65) Prior Publication Data

US 2020/0334162 A1 Oct. 22, 2020

(51) Int. Cl.
*G06F 12/0877* (2016.01)

(52) U.S. Cl.
CPC ...... *G06F 12/0877* (2013.01); *G06F 2212/60* (2013.01)

(58) Field of Classification Search
CPC ............ G06F 12/023; G06F 12/0877; G06F 12/0886; G06F 12/121; G06F 2212/1016; G06F 2212/163; G06F 2212/502; G06F 2212/60; G06F 11/34; G06F 16/00
See application file for complete search history.

(56) References Cited

U.S. PATENT DOCUMENTS

| | | | | |
|---|---|---|---|---|
| 5,651,136 A | * | 7/1997 | Denton | G06F 12/023 711/118 |
| 8,082,397 B1 | * | 12/2011 | Ezra | G06F 12/084 711/130 |
| 10,303,598 B2 | * | 5/2019 | Canepa | G06F 12/0246 |
| 2020/0142828 A1 | * | 5/2020 | Yao | G06F 12/0868 |

OTHER PUBLICATIONS

"Page replacement algorithm"; Wikipedia; Feb. 6, 2019; https://web.archive.org/web/20190206064445/https://en.wikipedia.org/wiki/Page_replacement_algorithm.

* cited by examiner

*Primary Examiner* — Aracelis Ruiz
(74) *Attorney, Agent, or Firm* — Chamberlain, Hrdlicka, White, Williams & Aughtry

(57) ABSTRACT

A data processing device includes a cache. The cache stores data. The data processing device also includes a cache manager. The cache manager monitors use of the cache to obtain cache use data. The cache manager identifies a slot allocation of the cache. The cache manager generates a new slot allocation based on the cache use data and the slot allocation. The cache manager reformats the cache based on the new slot allocation to obtain an updated cache.

14 Claims, 12 Drawing Sheets

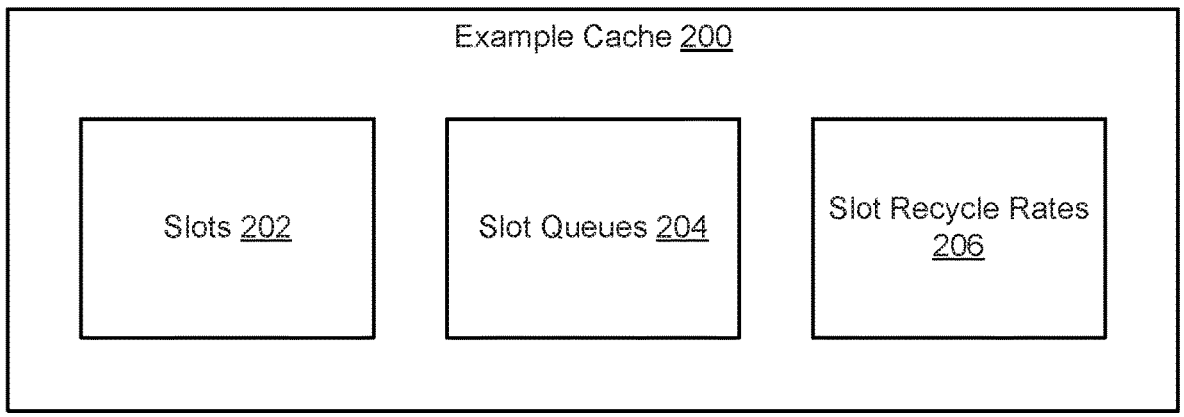
FIG. 2.1
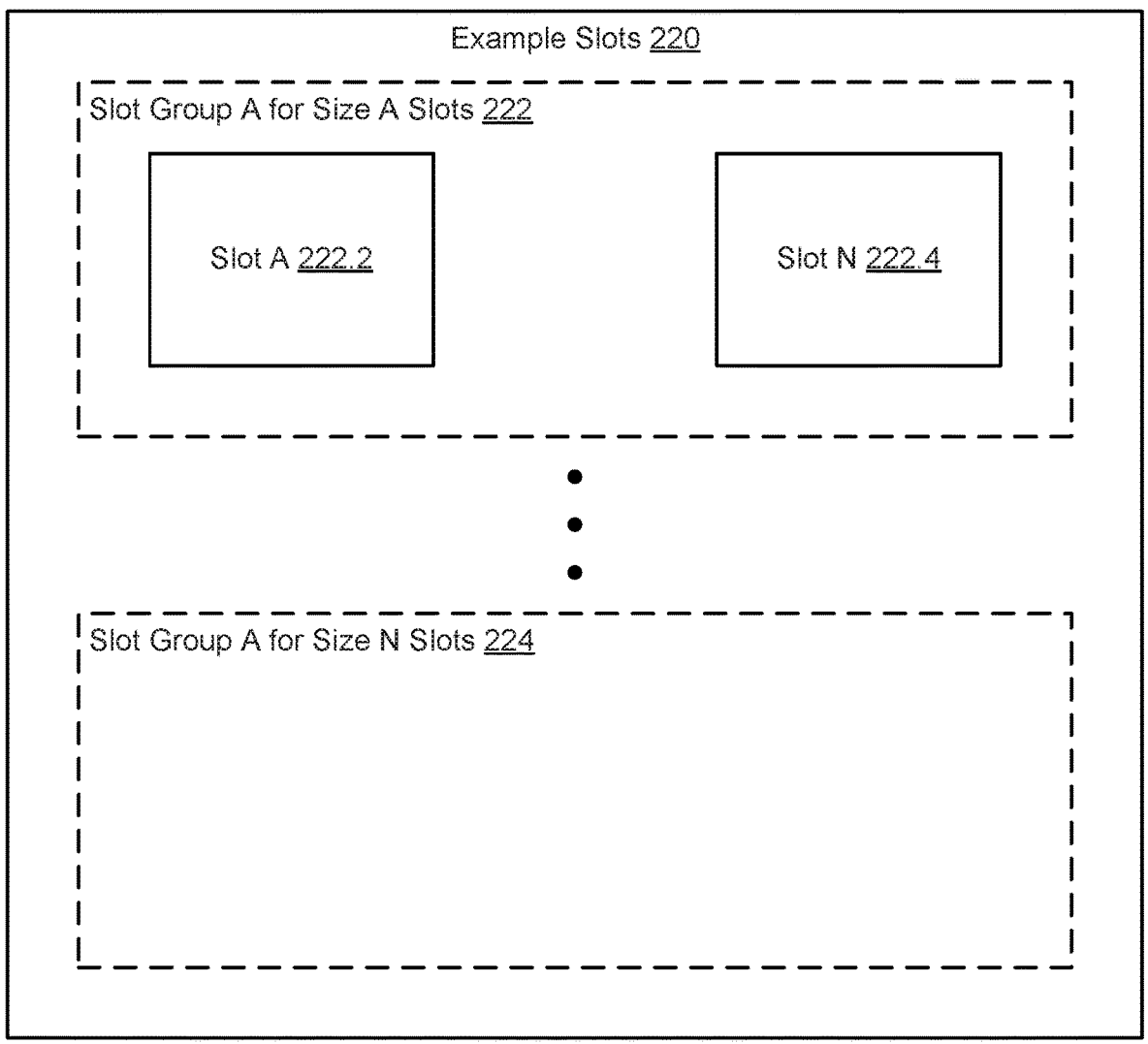
FIG. 2.2

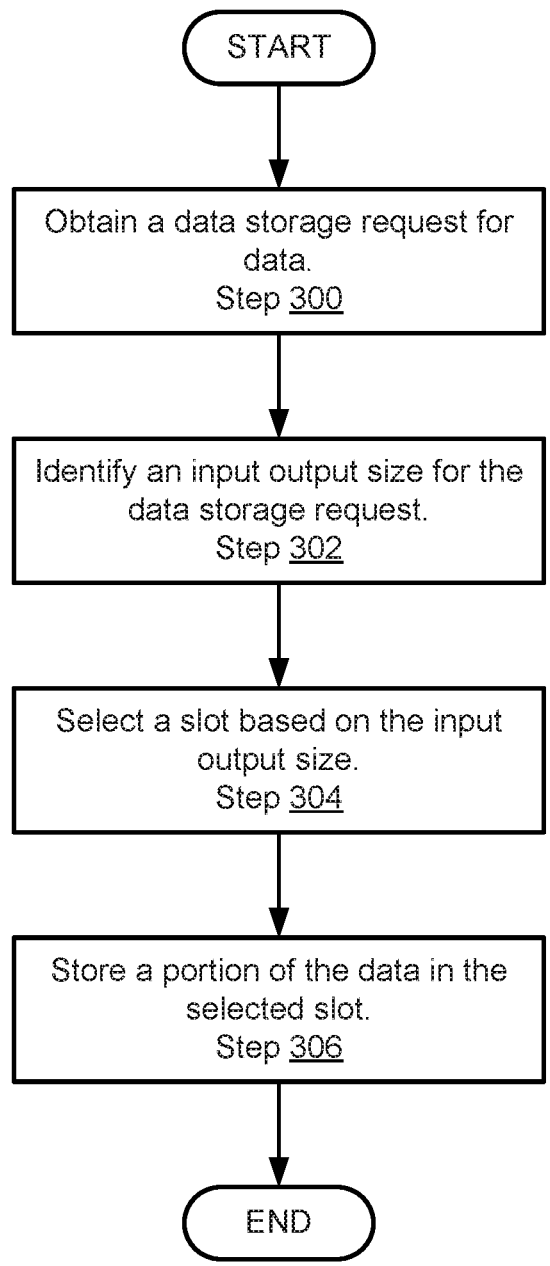
FIG. 3.1

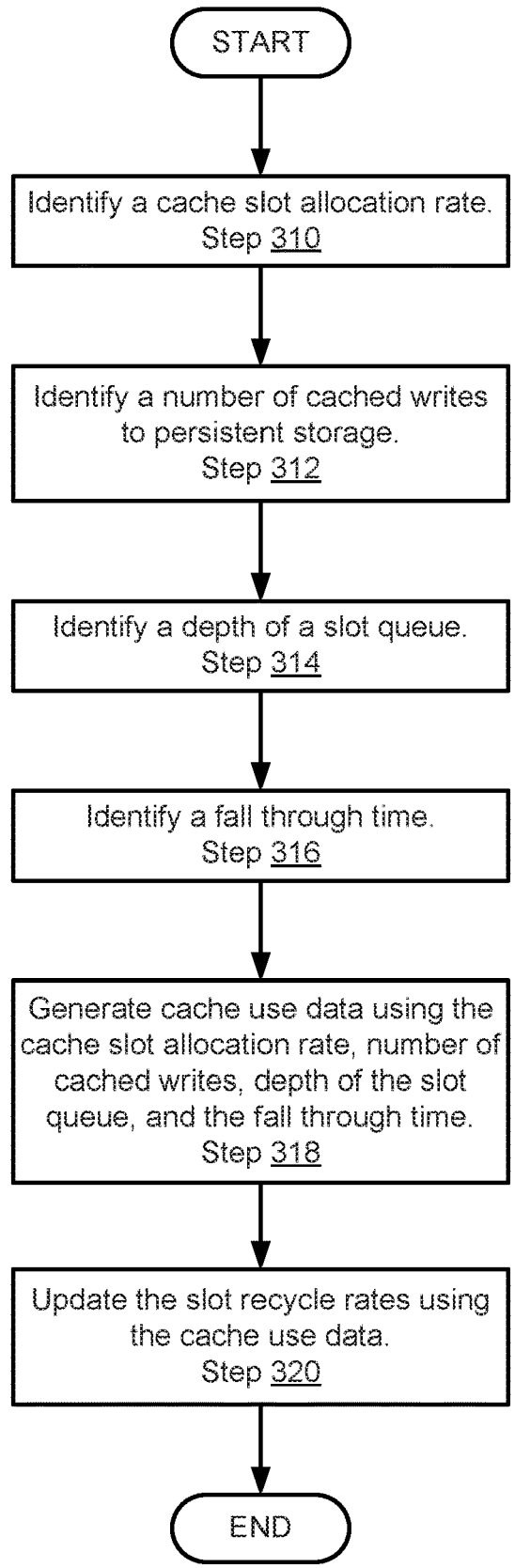
FIG. 3.2

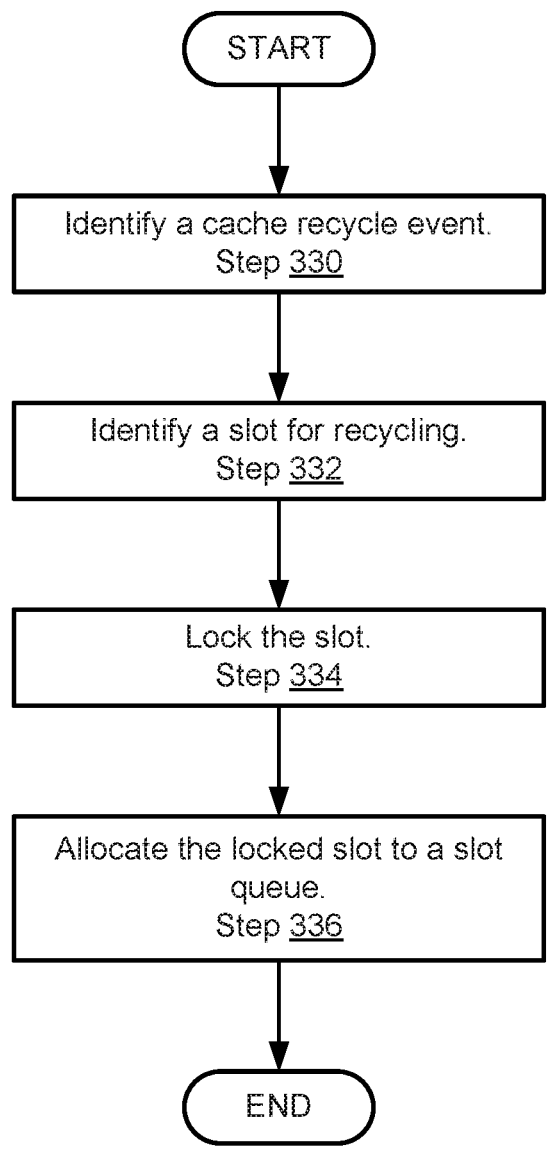
FIG. 3.3

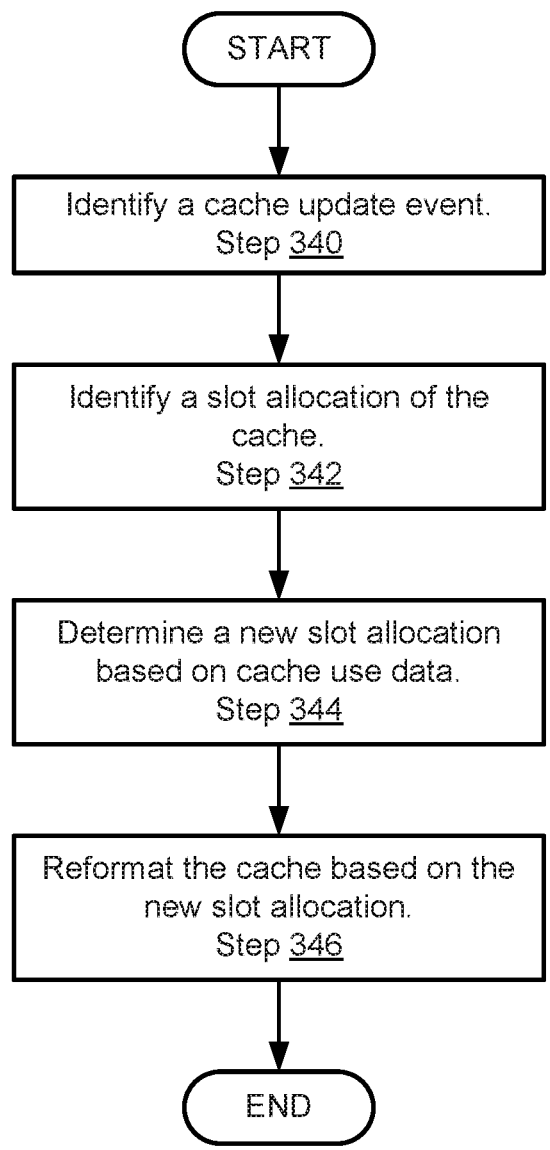
FIG. 3.4

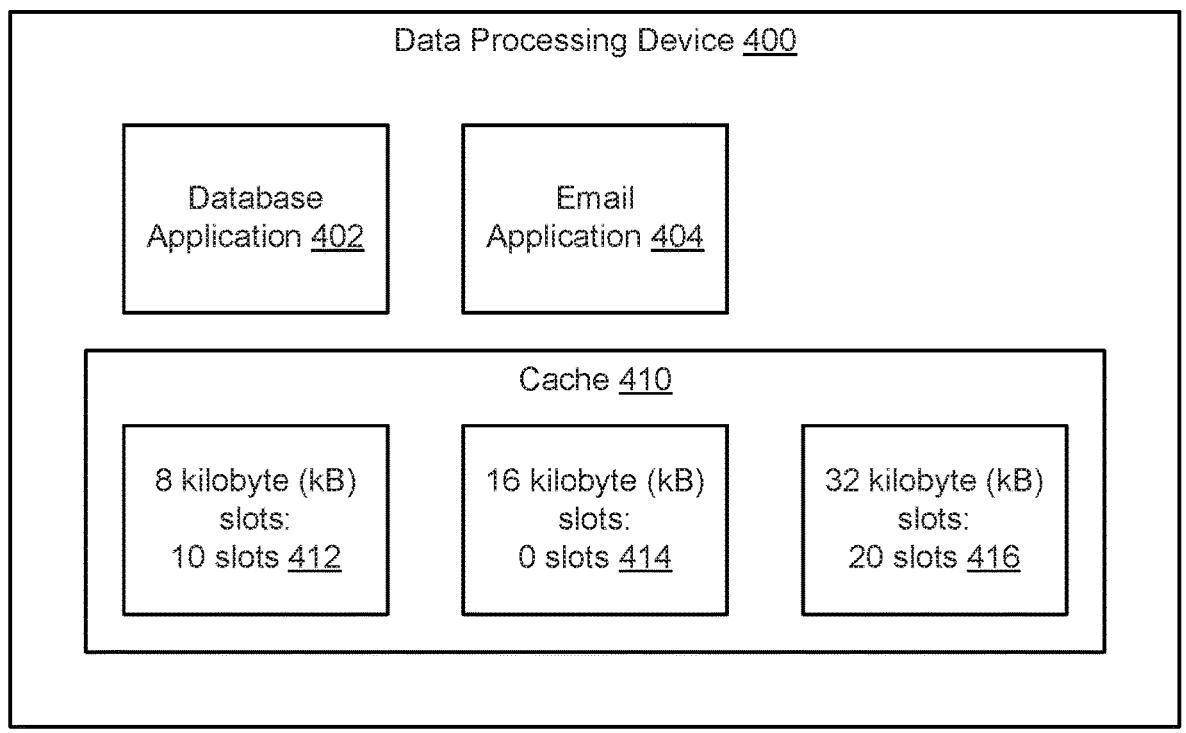
FIG. 4.1

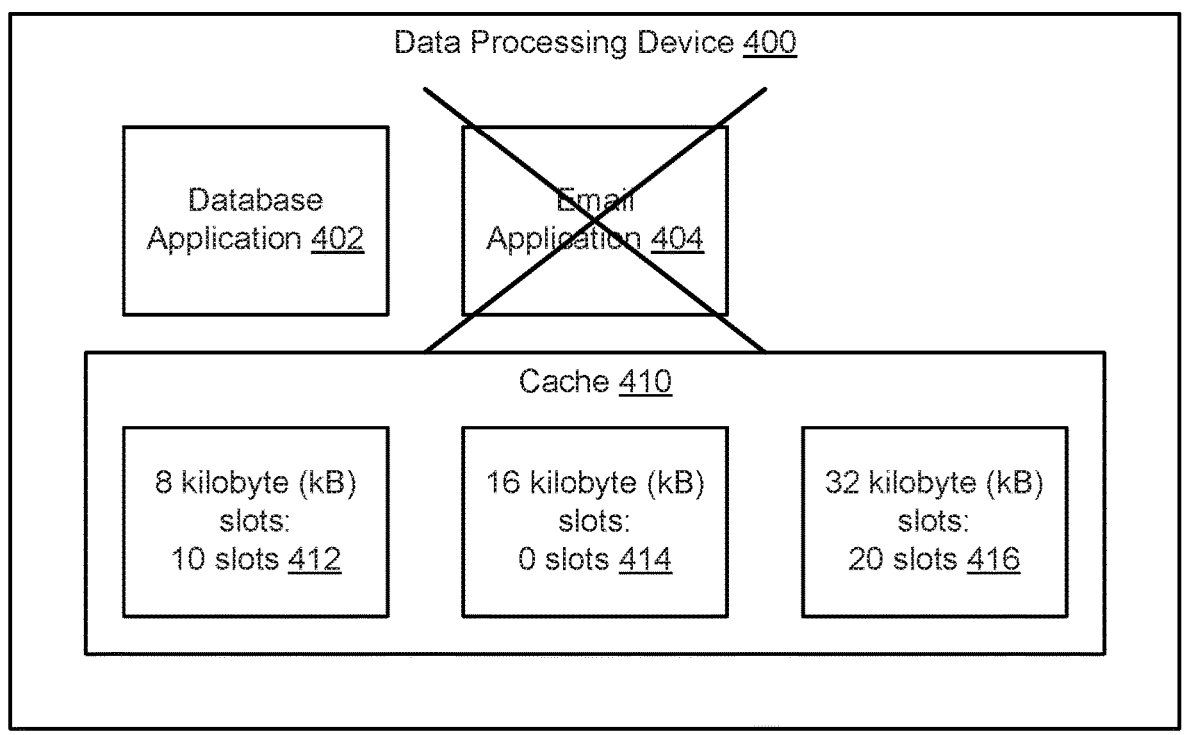
FIG. 4.2

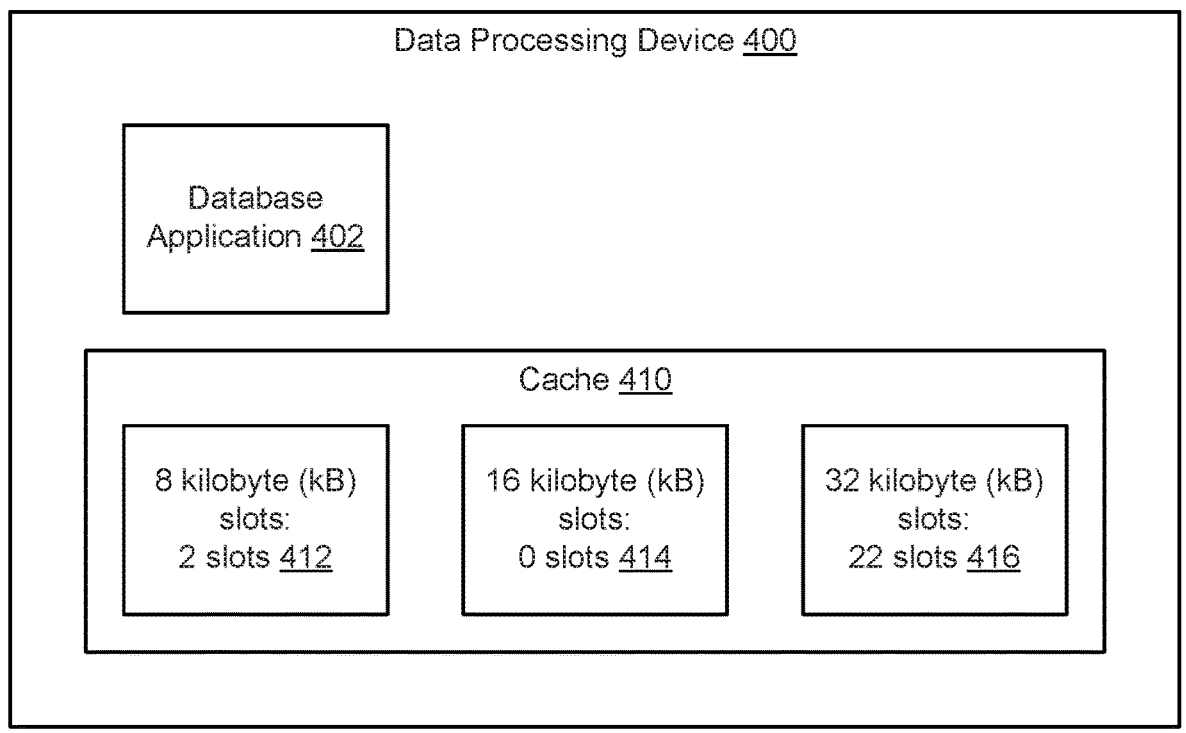
FIG. 4.3

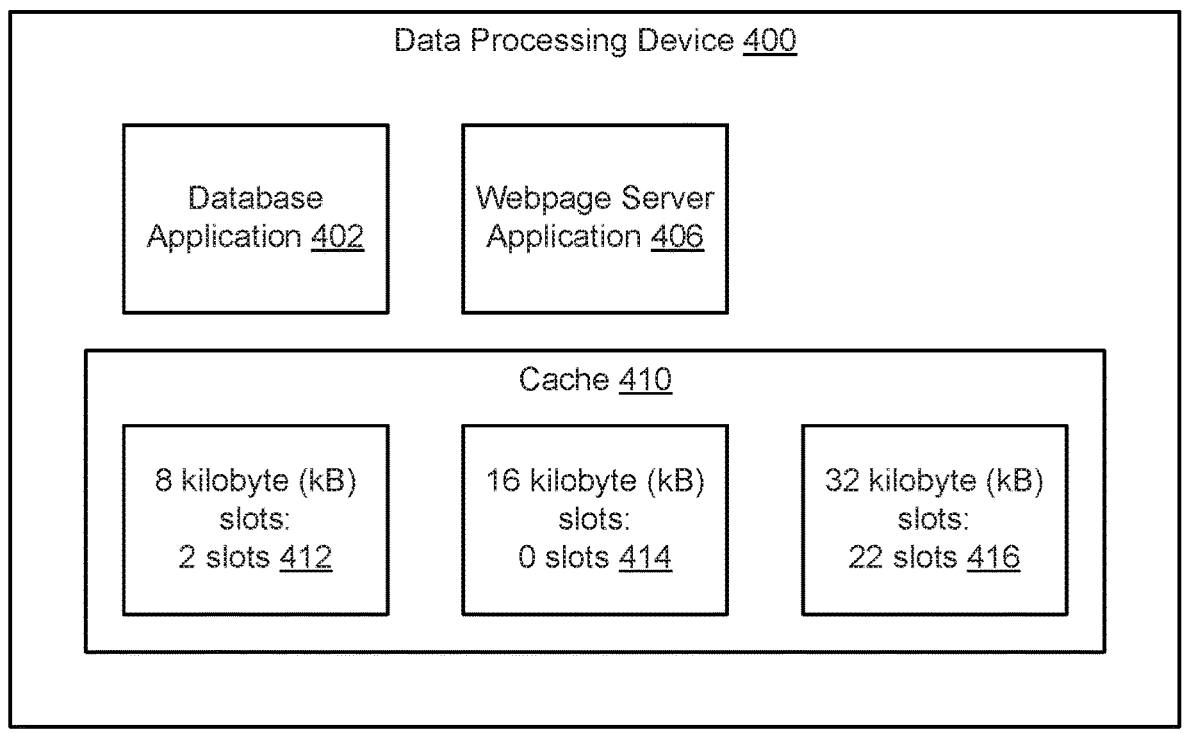
FIG. 4.4

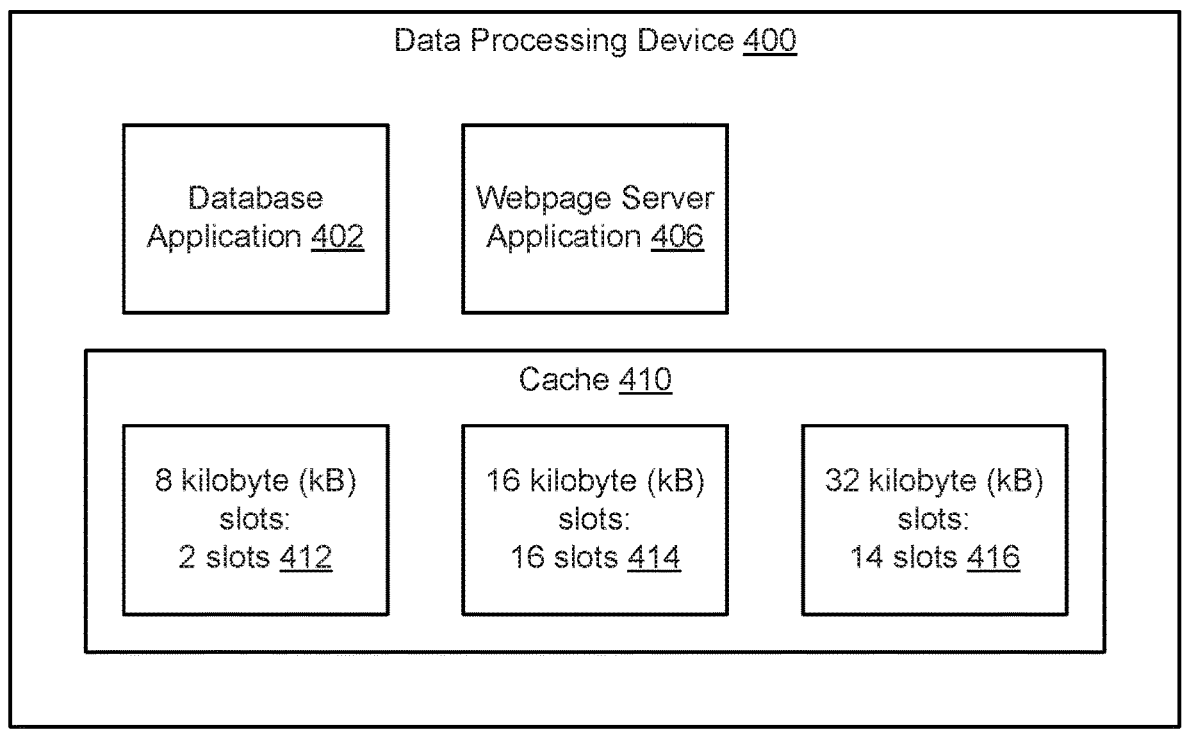
FIG. 4.5

SYSTEM AND METHOD FOR MANAGING A HETEROGENEOUS CACHE

BACKGROUND

Computing devices may generate data during their operation. For example, applications hosted by the computing devices may generate data used by the applications to perform their functions. Such data may be stored in persistent storage of the computing devices.

Depending on the number and type of applications hosted by a computing device, data may be generated at different rates. For example, some applications may generate large amounts of data very quickly while other types of application may generate data very slowly. The resulting data generation rate for all of the applications hosted by a computing device may place a storage workload on the computing device that must be serviced by the storage resources of the computing device.

SUMMARY

In one aspect, a data processing device in accordance with one or more embodiments of the invention includes a cache for storing data and a cache manager. The cache manager monitors use of the cache to obtain cache use data; identifies a slot allocation of the cache; generates a new slot allocation based on the cache use data and the slot allocation; and reformats the cache based on the new slot allocation to obtain an updated cache.

In one aspect, a method for managing a cache in accordance with one or more embodiments of the invention includes monitoring use of the cache to obtain cache use data; identifying a slot allocation of the cache; generating a new slot allocation based on the cache use data and the slot allocation; and reformatting the cache based on the new slot allocation to obtain an updated cache.

A non-transitory computer readable medium in accordance with one or more embodiments of the invention includes computer readable program code, which when executed by a computer processor enables the computer processor to perform a method for managing a cache. The method includes monitoring use of the cache to obtain cache use data; identifying a slot allocation of the cache; generating a new slot allocation based on the cache use data and the slot allocation; and reformatting the cache based on the new slot allocation to obtain an updated cache.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example cache in accordance with one or more embodiments of the invention.

FIG. 2.2 shows a diagram of example slots in accordance with one or more embodiments of the invention.

FIG. 3.1 shows a flowchart of a method of storing data in a cache in accordance with one or more embodiments of the invention.

FIG. 3.2 shows a flowchart of a method of generating cache use data in accordance with one or more embodiments of the invention.

FIG. 3.3 shows a flowchart of a method of recycling slots in accordance with one or more embodiments of the invention.

FIG. 3.4 shows a flowchart of a method of reformatting a cache in accordance with one or more embodiments of the invention.

FIGS. 4.1-4.5 show a non-limiting example of a system in accordance with embodiments of the invention at different points in time.

DETAILED DESCRIPTION

Figure 1:
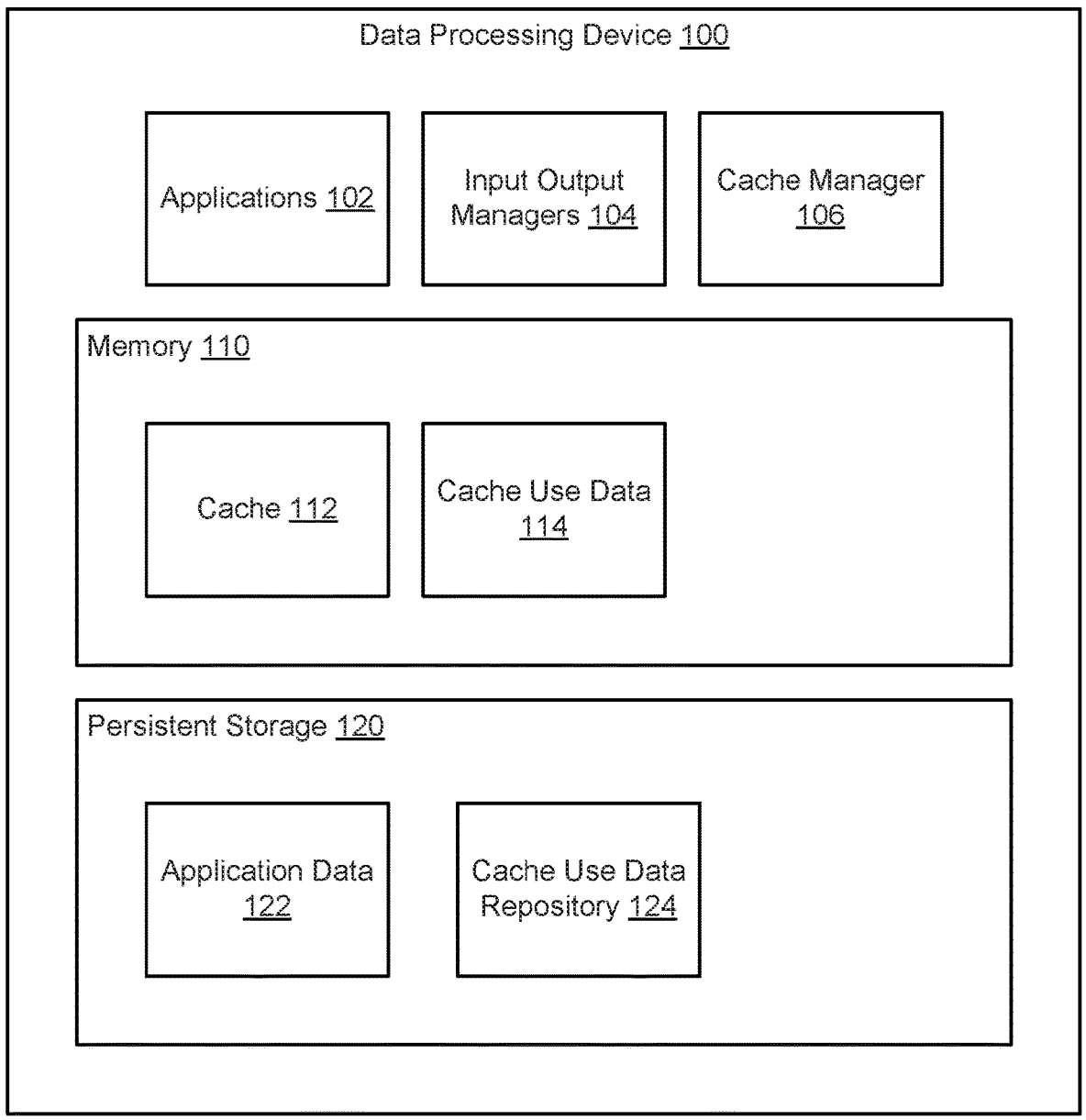
FIG. 1 shows a diagram of a data processing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data storage services. For example, a system and/or device in accordance with embodiments of the invention may include persistent storage for storing data and a cache associated with the persistent storage. The cache may be used to provide high speed data storage services to buffer data that is going to be stored in the persistent storage. By doing so, data may be generated at a rate faster than the rate at which data may be stored in the persistent storage without deleterious impacts.

In one or more embodiments of the invention, the cache includes slots of different sizes, i.e., a heterogeneous cache. A slot of the cache may be the smallest addressable portion of the cache. By having slots of different sizes, blocks of data of different sizes may be stored in slots of corresponding sizes. By storing the blocks of the data in slots of the same size, the storage footprint for storing the blocks may be minimized while also minimizing the number of block allocations required to store the blocks of the data. In contrast, a mismatch between the block size in the slot size may cause the blocks to have an increased storage footprint and/or require multiple block allocations for the storage of each block of the data.

Additionally, the cache may be structured to recycle slots of each slot size to minimize the number of slots of each size that are queued for reuse. The recycling of the slots may be modified based on information obtained regarding the cache during prior operation of the cache. By doing so, the efficiency of the use of the storage resources of the cache may be improved when compared to contemporary methods that do not dynamically modify process of recycling slots.

Further, embodiments of the invention may provide for slot recycling independent of storage of data in the cache. By doing so, resources may be better prioritized to the time sensitive task of storing data in the cache rather than on recycling of used slots of the cache.

FIG. 1 shows a diagram of the data processing device (100) in accordance with one or more embodiments of the invention. The data processing device (100) may include computing resources (e.g., processing resources, memory resources, storage resources, communication resources, and/or other types).

The computing resources may include processors, memory (e.g., 110), persistent storage (e.g., 120), etc. that provide the data processing device (100) with computing resources. In one or more embodiments of the invention, the data processing device (100) is a computing device. For additional information regarding computing devices, refer to FIG. 5.

In one or more embodiments of the invention, the data processing device (100) hosts one or more applications (102). The applications (102) may be logical entities that utilize the computing resources of the data processing device (100) for their execution. In other words, each of the applications (102) may be implemented as computer instructions stored in persistent storage (e.g., 120) that when executed by a processor of the data processing device (100) and/or other entities give rise to the functionality of the applications (102). The data processing device (100) may host any number of applications (102) without departing from the invention.

The applications (102) may provide application services to users of the data processing device (100), other entities hosted by the data processing device (100), and/or to other entities that are remote, e.g., operably connected to the data processing device (100) via one or more wired and/or wireless networks, from the data processing device (100). For example, the applications (102) may be database applications, electronic communication applications, filesharing applications, and/or other types of applications.

Each of the applications (102) may perform similar or different functions. For example, a first application may be a database application and a second application may be an electronic communications application. In another example, a first application may be a first instance of a database application and a second application may be a second instance of the database application.

In one or more embodiments of the invention, all, or portion, of the applications (102) provide application services. The provided services may correspond to the type of application of each of the applications (102). When providing application services, the applications (102) may store application data (122) in persistent storage (120). The application data (122) may be any type and quantity of data.

However, the speed at which data may be stored in persistent storage (120) may be much slower than the speed at which data may be stored in memory (110). To improve the rate at which stored data may be stored, the data processing device (100) may include a cache (112) for (or otherwise associated with) the persistent storage (120).

The cache (112) may be a data structure for storing data until it may be stored in the persistent storage (120). For example, consider a scenario in which the applications (102) generate application data at 1 Gigabyte per second for 10 seconds resulting in the generation of 10 Gigabytes of data for storage in persistent storage. However, the persistent storage may only be capable of storing data at a rate of 0.1 Gigabytes per second while the memory may be capable of storing data at a rate of 10 Gigabytes per second. In such a scenario, it is not possible for the persistent storage to keep up with the data generation rate of the applications.

To address such a scenario and/or for other reasons, data generated by the applications (102) and/or other entities may be stored in the cache (112). Once stored in the cache (112), the data in the cache may be queued for storage in the persistent storage (120) as the application data (122). In this manner, the cache (112) may be used to temporarily store data at a high rate of speed so that the persistent storage (120) may store the data over a longer period of time to accommodate is slower data storing capabilities.

The cache (112) may be logically divided into slots. A slot may be the smallest addressable portion of the cache (112). A may include a predetermined number of bits, e.g., a slot size. The cache (112) may include slots of different sizes. For example, the cache (112) may include a first slot having a size of 8 kilobytes, a second slot having a size of 16 kilobytes, a third slot having a size of 32 kilobytes, etc.

When data is stored in the cache (112), different sizes of slots may be preferentially used for the storage depending on the size of the blocks of the data. For example, when data is stored in the cache (112), it may be performed by streaming blocks of the data of a predetermined size, e.g., 8 kilobytes, 16 kilobytes, 32 kilobytes, etc. Slots of a size corresponding to the block size of the data may be preferentially used for storing the data. By doing so, the overhead for storing the data and/or the footprint of the data in the cache may be minimized.

For example, if a block of data does not match a slot size, multiple slots may need to be used to store the block. In such a scenario, the overhead for storing the block is higher because multiple slot allocations may need to be performed for storing the block. Each such allocation may have a corresponding computational cost.

In another example, if a block of data does not match a slot size, a portion of the slot may not be used if the block is smaller than the slot. This results in the block consuming more storage space of the memory (110) for storage because the unused portion of the slot is not addressable. Consequently, the unused portion of the slot is effectively consumed by storing of the block in the slot.

Thus, embodiments of the invention may provide a more efficient method for utilizing a cache by matching the block size of data to slots having the same, or similar, block sizes. By doing so, the footprint of the blocks may be reduced and the computation cost for storing may be reduced by reducing the number of slot allocation operations that need to be performed when compared to contemporary caches. For additional details regarding the cache (112), refer to FIGS. 2.1-2.2.

While the cache (112) is illustrated as being hosted by memory (110), e.g., general purpose random access memory, in FIG. 1, the cache (112) may be hosted by special purpose volatile memory, separate from the memory (110), without departing from the invention. For example, the cache (112) may be hosted by a storage controller (not shown) or another special purpose device for managing data storage. A storage controller may be a hardware device used to manage data storage. The storage controller may include volatile memory for storage of the cache (112). The volatile memory may be very high performance, i.e., very low latency, high input output operation throughput, high bandwidth, etc. The performance of the volatile memory of the storage controller may even surpass that of the memory (110). In such a scenario, the functionality of the input output managers (104) and the cache manager (106), discussed below, may be performed by the storage controller.

The storage controller may be a part of the data processing device (100) or may be part of another device. For example, the storage controller may be a part of another data processing device. Alternatively, the storage controller may be an independent device.

Further, in some embodiments of the invention, multiple storage controllers may cooperatively manage storing of data in the persistent storage (120). In such a scenario, each of the storage controllers may be separate hardware devices that manage storage of data in one or more hardware storage devices of the persistent storage (120). The collective action of the multiple storage controllers may provide the functionality of the input output managers (104), the cache manager (106), and the cache (114). To provide such functionality, each of the storage controllers may include processing resources, memory resources, storage resources, and/or communication resources.

Each of the multiple storage controllers may be part of the data processing device (100), may be hosted by other device (e.g., other data processing devices), and/or may be separate, independent devices.

To manage the process of storing data via the cache (112), the data processing device (100) may include input output managers (104) and a cache manager (106). Each of these components of the data processing device (100) is discussed below.

The input output managers (104) may be applications tasked with facilitating the storage of data from the applications (102) in the persistent storage (120). To do so, the input output managers (104) may match a block size of the data to corresponding slots for storing of the data in the cache (112) temporarily. The matched slots may be used to store the data.

If slots of the block size are unavailable for storing the data, the input output manager (104) may use slots of other sizes for storing of the data. However, as noted above, doing so may be inefficient. As will be discussed in greater detail below, the number of slots of each size may be dynamically adjusted to reduce the likelihood that slots of the size corresponding to data block sizes are unavailable.

While the input output managers (104) have been described as applications, e.g., computer instructions stored in persistent storage that when executed by a processor of the data processing device (100) cause the data processing device (100) to perform the functionality of the input output managers (104), the input output managers (104) may be implemented as a hardware device without departing from the invention. For example, the input output managers (104) may be implemented as an application specific circuit, a digital signal processor, or any other type of specialized hardware device for providing the functionality of the input output managers (104).

To provide the above noted functionality of the input output managers (104), the input output managers (104) may perform all, or a portion, of the method illustrated in FIG. 3.1.

The cache manager (106) may be an application that provides cache management services. Cache management services may include (i) monitoring use of the cache to obtain cache use data (114), (ii) setting recycle rates for slots based on the obtained cache use data (114), (iii) dynamically adjusting the number of slots of different sizes of the cache based on the obtained cache use data (114), and (iv) recycling slots of the cache (112) based on the cache use data (114). By doing so, the cache manager (106) may adjust the operation of the cache (112) to match the storage workloads, e.g., storage demands of the applications (102), of the data processing device (100). In other words, as the storage workloads of the data processing device (100) change over time, the cache manager (106) may update the operation of the cache (112) based on the changes to the storage workloads to more efficiently provide cache services.

In one or more embodiments of the invention, the cache manager (106) operates independently of the input output managers (104). For example, the functionality of the cache manager (106) may be performed without interfering with or otherwise impacting the functionality of the input output managers (104). In other words, the functionality of managing the cache may be bifurcated from the functionality of storing data in the cache (112) facilitated by the input output managers (104). By doing so, management of the cache (112) may not impact the time sensitive duty of storing data that is performed by the input output managers (104). For example, the cache manager (106) may recycle slots of the cache (112) without burdening the input output managers (104).

While the cache manager (106) has been described as applications, e.g., computer instructions stored in persistent storage that when executed by a processor of the data processing device (100) cause the data processing device (100) to perform the functionality of the cache manager (106), the cache manager (106) may be implemented as a hardware device without departing from the invention. For example, the cache manager (106) may be implemented as an application specific circuit, a digital signal processor, or any other type of specialized hardware device for providing the functionality of the cache manager (106).

To provide the above noted functionality of the cache manager (106), the cache manager (106) may perform all, or a portion, of the methods illustrated in FIGS. 3.2-3.4.

The persistent storage (120) may store data including the application data (122) and a cache use data repository (124). The cache use data repository (124) may include copies of the cache use data (114) over time. For example, as the storage workloads of the data processing device (100) change, the information included in the cache use data (114) may change. Copies of the cache use data (114), or portions thereof, at different points in time may be stored in the cache use data repository (124).

The persistent storage (120) may include any number of physical storage devices for storing data. For example, the persistent storage (120) may include hard disk drives, solid state drives, tape drives, and/or any other type of physical device for storing data.

While the data processing device (100) of FIG. 1 has been described and illustrated as including a limited number of components for the sake of brevity, a data processing device (100) in accordance with embodiments of the invention may include additional, fewer, and/or different components than those illustrated in FIG. 1 without departing from the invention.

As discussed above, the cache manager (106) may manage the cache (112). FIG. 2.1 shows a diagram of an example cache (200) in accordance with one or more embodiments of the invention.

The example cache (200) may include any number of slots (202), slot queues (204) associated with groups of the slots (202), and slot recycle rates (206) associated with the groups of the slots (202). Each of these data structures is discussed below.

As discussed above, the slots (202) may be the smallest addressable portions of the example cache (200). Each of the slots (202) may be associated with a portion of the physical data storage resources of the memory. As will be discussed in greater detail with respect to FIG. 2.2, the slots (202) may be grouped based on the size of the slots.

The slot queues (204) may be data structures that specify an order in which the slots are used for data storage purposes. There slot queues (204) may include a queue for each group of the slots.

For example, when a slot that was storing data is recycled, it may be added to a slot queue associated with a slot group that includes the slots of the size of the slot. Thus, all slots of a particular size may be ordered with respect to each other for data storage purposes.

By doing so, a queue for each slot size may be generated. Consequently, when an input output manager receives a block of a data of a particular size, the input output manager may determine a slot for storing the data by selecting the next queued slot of slot size of the block. If no such slots are available, one or more slots of another size may be selected for storing the block using different queues.

The slot recycle rates (206) may be a data structure that includes information regarding the rate at which slots of differing sizes are to be recycled. The slot recycle rates (206) may be used by the cache manager to determine when to perform recycling for each slot size. The slot recycle rate for each slot size may be determined based on cache use data. The slot recycle rates (206) may be dynamically adjusted, using the cache use data, to reflect the storage workloads the data processing device is encountering.

As discussed above, the slots (202) may be grouped. FIG. 220 shows a diagram of example slots (220) in accordance with one or more embodiments of the invention. As discussed above, there may be any number of slots (e.g., 222.2, 222.4). The example slots (220) may be logically grouped into different slot groups (e.g., 222, 224). Each of the slot groups (e.g., 222, 224) may include any number of slots. As the number of slots of each size is dynamically adjusted by the cache manager, the resulting number of slots in each of the slot groups (e.g., 222, 224) may change.

To further clarify aspects of embodiments of the invention, diagrams of methods that may be performed by components of the data processing device of FIG. 1 are shown in FIGS. 3.1-3.4.

FIG. 3.1 shows a flowchart of a method in accordance with one or more embodiments of the invention. The method depicted in FIG. 3.1 be used to store data in a cache in accordance with one or more embodiments of the invention. The method shown in FIG. 3.1 may be performed by, for example, input output managers (e.g., 104, FIG. 1). Other components of the system illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, the data storage request for data is obtained.

In one or more embodiments of the invention, the data storage request is obtained from an application. The data storage request may be obtained from other entities without departing from the invention.

In one or more embodiments of the invention, the data is in a stream format. The stream format may divide the data into any number of blocks. Each of the blocks may have a fixed size. For example, the fixed size may be 8 kilobytes, 16 kilobytes, 32 kilobytes, etc.

In step 302, an input output size for the data storage request is identified.

In one or more embodiments of the invention, the input output size for the data storage request is the size of the block. In other words, the input output size may be the size of portions of the data as they will be streamed for storage.

In step 304, the slot is selected based on the input output size.

In one or more embodiments of the invention, the slot is selected by matching the input output size to the size of the slot. Once matched to the size of the slot, a queue for that slot size may be used to identify the slot. For example, the queue for the matched size of the slot may specify the next slot of the size of the slot in which to store data. The slot specified by the queue may be used as the selected slot.

In step 306, a portion of the data is stored in the selected slot.

In one or more embodiments of the invention, the portion of the data is a block of the data that is the size of the slot. Steps 304 and 306 may be repeated for storing any number of portions of the data. By doing so, all of the portions of the data may be stored in slots having the same size as the portions of the data.

The method may end following step 306.

FIG. 3.2 shows a flowchart of a method in accordance with one or more embodiments of the invention. The method depicted in FIG. 3.2 be used to generate cache use data and/or update slot cycle rates using the cache use data in accordance with one or more embodiments of the invention. The method shown in FIG. 3.2 may be performed by, for example, a cache manager (e.g., 106, FIG. 1). Other components of the system illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, a cache slot allocation rate is identified.

In one or more embodiments of the invention, the cache slot allocation rate is identified by monitoring use of the cache. In one or more embodiments of the invention, the cache slot allocation rate for each slot size is monitored. The cache slot allocation rate may be monitored based on the rate at which slots are allocated by a queue associated with each slot size.

In step 312, a number of cached writes to persistent storage are identified. The number of cached writes to persistent storage may be identified by monitoring use of the cache. In one or more embodiments of the invention, the number of cached writes to persistent storage are identified for each slot size.

The number of cached writes may be identified by determining each slot of a particular size storing a portion of data. When a cached write is written to persistent storage, the slot may be released. Thus, only those slots of the particular size storing data that have not been released may counted to identify the number of cached writes for the particular slot size.

In step 314, a depth of a slot queue is identified. In one or more embodiments of the invention, the depth of the slot queue for each slot size is identified. The slot queue size for each slot size may be identified by determining the number of slots in the slot queue of each respective slot size.

In step 316, a fall through time of the cache is identified. The fall through time may be the average fall through time for slots of a particular size. The fall through time for each slot size may be identified. The fall through time for each slot size may be identified by determining the average time between when each slot of the slot size is used (i.e., used to store data) and when the respective slot is made available for reuse (available to store second data).

In Step 318, cache use data is generated using the cache slot allocation rate, the number of cached writes, the depth of the slot queue, and the fall through time.

In one or more embodiments of the invention, the cache use data is generated by adding the aforementioned information obtained in steps 310-316 to existing cache use data. In one or more embodiments of the invention, the cache use data is generated by instantiating a data structure to store the aforementioned information obtained in steps 310-316.

In step 320, the slot recycle rates are updated using the cache use data.

In one or more embodiments of the invention, the slot recycle rates are updated by estimating the rate at which slots of each slot size need to be made available to ensure that slots of each slot size are available for storing blocks of data of each slot size. The determined rates may be used to determine the slot recycle rates by setting the slot recycle rate to a predetermined amount larger than the rate at which slots of each slot size need to be made available to ensure that slots of each slot size are available for storing blocks of data of each slot size. The predetermined amount may be, for example 10%. Other predetermined amounts may be used without departing from the invention.

The method may end following step 320.

FIG. 3.3 shows a flowchart of a method in accordance with one or more embodiments of the invention. The method depicted in FIG. 3.3 be used to recycle slots in accordance with one or more embodiments of the invention. The method shown in FIG. 3.3 may be performed by, for example, a cache manager (e.g., 106, FIG. 1). Other components of the system illustrated in FIG. 1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 330, a cache recycle event is identified.

In one or more embodiments of the invention, the cache recycle event is a point in time determined by a cache recycle rate associated with a slot size. For example, the cache recycle rate may specify a certain number of slots of the slot size that are to be recycled every 100 milliseconds. Thus, every 100 milliseconds a cache recycle event may occur. The cache recycle event may be identified by a schedule of when recycling of slots of the slot size associated with the cache recycle rate is to be performed.

The cache recycle event may be identified via other methods without departing from the invention. For example, the cache recycle event may be the depth of a slot queue reaching a predetermined value size.

In step 332, a slot for recycling is identified.

In one or more embodiments of the invention, the slot for recycling is identified by finding a slot that is not locked and that has a slot size the same as that associated with the cache recycle event. For example, when a slot is used for storing a block of data, the slot may be locked until its contents are stored in persistent storage. Once its contents are stored in persistent storage, the slot may be unlocked to indicate that it is available.

In step 334, the slot is locked.

In one or more embodiments of the invention, locking the slot prevents data blocks from being stored in the slot and/or being otherwise used.

In step 336, the locked slot is allocated to a slot queue. Allocating the locked slot to the slot queue may queue the locked slot for future storage of data. The slot queue may be associated with the size of the locked slot. For example, the slot queue may only be for slots of the size of the locked slot.

The method may end following step 336.

FIG. 3.4 shows a flowchart of a method in accordance with one or more embodiments of the invention. The method depicted in FIG. 3.4 be used to reformat a cache in accordance with one or more embodiments of the invention. The method shown in FIG. 3.4 may be performed by, for example, a cache manager (e.g., 106, FIG. 1). Other components of the system illustrated in FIG. 1 may perform all, or a portion, of the method of FIG. 3.4 without departing from the invention.

While FIG. 3.4 is illustrated as a series of steps, any of the steps may be omitted, performed in a different order, additional steps may be included, and/or any or all of the steps may be performed in a parallel and/or partially overlapping manner without departing from the invention.

In step 340, a cache update event is identified.

In one or more embodiments of the invention, the cache update event is identified using cache use data. For example, the cache update event may be identified by determining that the number of slots of the cache having a slot size is too small. The determination may be made using cache use data by estimating whether it is likely that the number of slots having the slot size will be unable to handle a storage workload associated with the slot size. In other words, whether it is likely that the storage workload will result in data blocks being stored in slots that are of a different size then the data blocks.

In step 342, a slot allocation of cache is identified.

In one or more embodiments of the invention, the slot allocation of the cache is relative number of slots of each slot size of the cache.

In step 344, the new slot allocation is determined based on the cache use data.

In one or more embodiments of the invention, the new slot allocation specifies that the number of slots of a slot size is to be increased or decreased when compared to the slot allocation.

In step 346, the cache is reformatted based on the new slot allocation.

In one or more embodiments of the invention, reformatting the cache based on the new slot allocation changes the number of slots of each size of the cache to match that specified by the new slot allocation. In other words, one or more slots of one slot size are modified to have a second slot size. By doing so, the number of slots of each slot size may be dynamically adjusted.

The method may end following Step 346.

To further clarify embodiments of the invention, a non-limiting example is provided in FIGS. 4.1-4.5. Each of these figures may illustrate a system and/or data of the system similar to that illustrated in FIG. 1 at different points in times. For the sake of brevity, only a limited number of components of the system of FIG. 1 are illustrated in each of FIGS. 4.1-4.5.

Example

Consider a scenario as illustrated in FIG. 4.1 in which the data processing device (400) is hosting the database application (402) and an email application (404). To provide data storage services to the database application (402) and the email application (404). The data processing device (400) includes a cache (410).

Between the database application (402) and the email application (404), the database application (402) places a much larger storage workload on the data processing device (400). For example, the database application (402) may be constantly updating the database as new data is added to the database.

When the database application (402) stores data, it uses a block size of 32 kilobytes (kB). In contrast, the email application (404) uses a block size of 8 kB. Consequently, when the data processing device (400) structured its cache (410), the cache included a small number of 8 kB slots (412), no 16 kB slots (414), and a large number of 32 kB slots (416). For example, the cache (410) includes 10 slots that are 8 kB wide and 20 slots that are 32 kB wide. Thus, the slots of the cache (410) have been tailored to match the relative stored workloads imposed upon the data processing device (400).

Over time, the workload on the database application (402) increased. To address the increased workload of the database application (402), administrator of the data processing device (400) move the email application (404) to another device as illustrated in FIG. 4.2. Once the email application (404) was removed, the 8 kB slots (412) of the cache (410) are no longer used because the database application (402) stores blocks of 32 kilobytes in size.

While the data processing device (400) was operating in the state shown in FIG. 4.2, cache use data was collected which reflects that now unused 8 kB slots (412). To more efficiently use the cache (410), the data processing device (400) reformatted the cache (410) based on the collected cache use data as shown in FIG. 4.3. As seen from FIG. 4.3, reformatting the cache (410) resulted in the number of 8 kB slots (412) being decreased to two slots and the 32 kB slots (416) being increased to 22 slots. Thus, by reformatting the cache (410), the number of slots having a slot size that corresponds to the block size being stored in the cache (410) better matching.

After reformatting the cache (410), the administrator of the data processing device (400) loaded a webpage server application (406) find to the data processing device (400) as illustrated in FIG. 4.4. The webpage server application (406) has a storage workload similar to that of the database application (402) but stores blocks of 16 kilobytes and with rather than the 32 kB with of the blocks stored by the database application (402).

After loading the webpage server application (406), the data processing device (400) updates the cache use data based on the new data blocks being stored in the cache (410). Because the cache (410) does not include any 16 kB slots (414), the cache use data indicates that 32 kB slots are being used to store the blocks from the webpage server application (406).

To more efficiently use the cache (410), the data processing device (400) reformats the cache (410) as illustrated in FIG. 4.5. After reformatting, the cache (410) includes 16 slots that are 16 kB slots (414) and 14 slots that are 32 kB slots (416). Thus, the reformatted cache (410) now includes slots that are of the same size as those provided for storage by the database application (402) and the webpage server application (406). Consequently, the efficiency of using the cache (410) is improved because the 16 kB blocks generated by the webpage server application (406) are no longer being stored in the 32 kB slots (416), which was resulting in half of each of the used 32 kB slots (416) being empty.

End of Example

Figure 5:
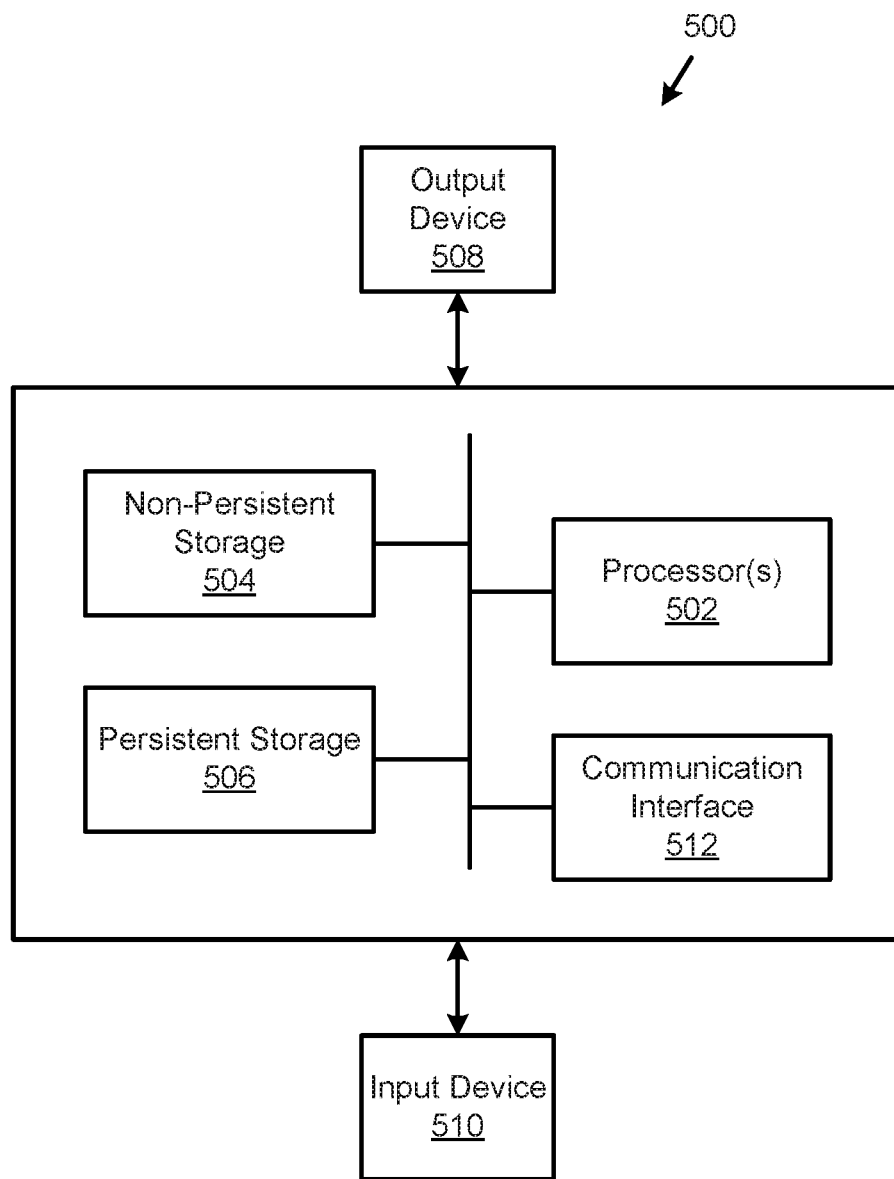
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a cache that dynamically updates the number of slots of different slot sizes for caching data for storage in the persistent storage. By doing so, data may be cached in a more efficient manner when compared to contemporary methods. For example, by dynamically allocating the number of slots of each slot size, the size of the slots used to store data blocks may be matched to the size of the data blocks. Doing so may reduce the effective storage footprint by ensuring that each slot is fully used for storing data and/or the number of slots allocated to store each block is a single allocation.

Thus, embodiments of the invention may address the problem of mismatches between block sizes to be stored in a cache and the size of the slots of the cache. The aforementioned problem arises due to the technological environment in which caching of data is used due to limitations in the addressability of storage resources of computing devices.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data processing device, comprising:
    cache for storing data, wherein the cache is divided into a plurality of slot groups each associated with a different slot size, and wherein the different slot size associated with each of the slot groups of the plurality of slot groups is a size of each slot of the respective slot group of the plurality of slot groups; and
    a cache manager programmed to:
        monitor use of the cache to obtain cache use data;
        identify a slot allocation of a number of slots in each of the plurality of slot groups;
        generate a new slot allocation for the number of slots in each of the plurality of slot groups based on the cache use data, the size of each slot of the respective slot group of the plurality of slot groups, and the slot allocation; and
        reformat the cache based on the new slot allocation to obtain an updated cache.

2. The data processing device of claim 1, wherein a slot size associated with a first slot group of the plurality of slot groups is different from a second slot size associated with a second slot group of the plurality of slot groups.

3. The data processing device of claim 1, wherein the cache use data comprises:
    a cache slot allocation rate of the cache;
    a number of cached writing of the cache to persistent storage, wherein the persistent storage is operatively connected to the cache;
    a depth of a slot queue associated with a slot from among the plurality of slot groups of the cache; and
    a fall through time of the cache.

4. The data processing device of claim 1, wherein the cache manager is further programmed to:
    obtain a data storage request for data;
    identify an input output size for the data store request;
    select a slot of the cache based on the input output size; and
    store a portion of the slot.

5. The data processing device of claim 1, wherein the cache manager is further programmed to:
    identify a cache recycle event;
    in response to identifying the cache recycle event:
        identify a slot for recycling;
        lock the slot; and
        allocate the locked slot to a slot queue.

6. The data processing device of claim 5, wherein the cache manager is further programmed to:
    update slot recycle rates using the cache use data, wherein the cache recycle event is specified by the slot recycle rates.

7. The data processing device of claim 1, further comprising:
    an input output manager that stores data in the cache in a slot selected based on a block size of the data and a size of the slot.

8. The data processing device of claim 7, wherein the input output manager operates independently from the cache manager.

9. A method for managing a cache, the method comprising:
    monitoring use of the cache to obtain cache use data, wherein the cache is divided into a plurality of slot groups each associated with a different slot size, and wherein the different slot size associated with each of the slot groups of the plurality of slot groups is a size of each slot of the respective slot group of the plurality of slot groups;
    identifying a slot allocation of a number of slots in each of the plurality of slot groups;
    generating a new slot allocation for the number of slots in each of the plurality of slot groups based on the cache use data, the size of each slot of the respective slot group of the plurality of slot groups, and the slot allocation; and
    reformatting the cache based on the new slot allocation to obtain an updated cache.

10. The method of claim 9, wherein a slot size associated with a first slot group of the plurality of slot groups is different from a second slot size associated with a second slot group of the plurality of slot groups.

11. The method of claim 9, wherein the cache use data comprises:
    a cache slot allocation rate of the cache;
    a number of cached writing of the cache to persistent storage, wherein the data processing device comprises the persistent storage;
    a depth of a slot queue associated with a slot from among the plurality of slot groups of the cache; and
    a fall through time of the cache.

12. A non-transitory computer readable medium comprising computer readable program code, which when executed by a computer processor enables the computer processor to perform a method for managing a cache, the method comprising:
    monitoring use of the cache to obtain cache use data, wherein the cache is divided into a plurality of slot groups each associated with a different slot size, and wherein the different slot size associated with each of the slot groups of the plurality of slot groups is a size of each slot of the respective slot group of the plurality of slot groups;
    identifying a slot allocation of a number of slots in each of the plurality of slot groups;
    generating a new slot allocation for the number of slots in each of the plurality of slot groups based on the cache use data, the size of each slot of the respective slot group of the plurality of slot groups, and the slot allocation; and
    reformatting the cache based on the new slot allocation to obtain an updated cache.

13. The non-transitory computer readable medium of claim 12, wherein a slot size associated with a first slot group of the plurality of slot groups is different from a second slot size associated with a second slot group of the plurality of slot groups.

14. The non-transitory computer readable medium of claim 12, wherein the cache use data comprises:
- a cache slot allocation rate of the cache;
- a number of cached writing of the cache to persistent storage, wherein the data processing device comprises the persistent storage;
- a depth of a slot queue associated with a slot from among the plurality of slot groups of the cache; and
- a fall through time of the cache.

\* \* \* \* \*